United States Patent Office 3,105,059
Patented Sept. 24, 1963

3,105,059
NOVEL MALEIMIDES AND POLYMERS STABILIZED THEREBY
Sjirk van der Burg, West Caldwell, N.J., assignor to United States Rubber Company, New York, N.Y., a corporation of New Jersey
No Drawing. Filed July 28, 1961, Ser. No. 127,486
8 Claims. (Cl. 260—45.8)

This invention relates to new chemicals.

The new compounds of the present invention are N-(3,5 - dialkyl - 2,5 - cyclohexadiene - 4 - one - 1 - ylidene-methyl)maleimides in which the alkyl radicals in the 3 and 5 positions have 1 to 8 carbon atoms. The compounds may be represented by the formula

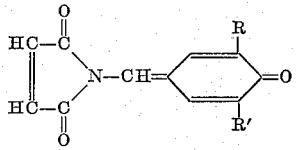

in which R and R' are alkyl radicals having 1 to 8 carbon atoms. These chemicals are useful as heat stabilizers for polyvinyl chloride.

The chemicals of the present invention are prepared by oxidizing the selected 2,6-dialkyl-4-(N-maleimidomethyl)phenol which may be previously prepared by reacting the selected 2,6-dialkylphenol with N-(chloromethyl)maleimide as described in Tawney U.S. application Serial No. 5,115, filed January 28, 1960, now Patent No. 3,000,900, issued September 19, 1961. Examples of the 2,6-dialkylphenols that may be used are 2,6-xylenol, 2,6-diisopropylphenol, 2-methyl-6-tert-butyl-phenol, 2,6-di-tert-butylphenol, 2,6-dicyclohexylphenol, 2-methyl-6-octylphenol. When these 2,6-dialkylphenols are reacted with N-(chloromethyl)maleimide, they give the corresponding 2,6-dialkyl - 4 - (N-maleimidomethyl)phenols. When the corresponding 2,6-dialkyl-4-(N-maleimidomethyl)phenols are oxidized according to the present invention they give the corresponding N-(3,5-dialkyl-2,5-cyclohexadiene-4-one-1-ylidene-methyl)maleimides as follows:

N - (3,5 - dimethyl - 2,5 - cyclohexadiene - 4 - one - 1-ylidene-methyl)maleimide N - (3,5 - diisopropyl - 2,5 cyclohexadiene - 4 - one-1-ylidene-methyl)maleimide N - (3 - methyl - 5 - tert - butyl - 2,5 - cyclohexadiene-4-one-1-ylidene-methyl)maleimide N - (3,5 - di - tert - butyl - 2,5 - cyclohexadiene - 4-one-1-ylidene-methyl)maleimide N - (3,5 - dicyclohexyl - 2,5 - cyclohexadiene - 4 - one-1-ylidene-methyl)maleimide N - (3 - methyl - 5 - octyl - 2,5 - cyclohexadiene - 4-one-1-ylidene-methyl)maleimide Example 1 shows the preparation of N-(3,5-di-tert-butyl-2,5-cyclohexadiene-4-one-1-ylidene-methyl) - maleimide according to the following reaction:

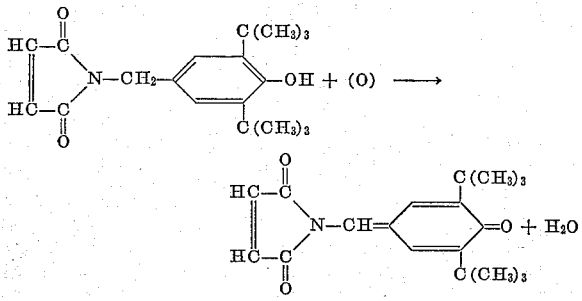

Example 1

In a three-necked flask, equipped with a stirrer, condenser, and gas inlet were placed 18.7 g. (.06 mole) of potassium ferricyanide, 3 g. of potassium hydroxide, 75 ml. of water and 300 ml. of benzene. After stirring for 90 min. under nitrogen, 7.56 g. (.024 mole) of 2,6-di-tert - butyl - 4-(N-maleimidomethyl)phenol (M.P. 151–153° C.) were added. The color of the solution changed from light yellow to blue and then to dark yellow. Stirring was continued for 4 hrs. at room temperature.

The insoluble parts were filtered and washed with ether. Yield: 6.85 g., M.P. 175–176° C.

*Analysis.*—Calculated for $C_{19}H_{23}O_3N$: C, 72.84%; H, 7.35%; N, 4.47%. Found: C, 72.85%; H, 7.64%; N, 4.69%. Molecular weight calculated, 313. The molecular weight was 297 as determined by the camphor method developed by Rast (Ref.: A Textbook of Practical Organic Chemistry, by A. I. Vogel, page 899; and Quantitative Micro-Analysis, by J. B. and V. Nieder, second edition, 1942, pages 217–220).

Examples of other oxidizing agents which may be used are ceric sulfate, ammoniacal silver nitrate, Fehlings solution, lead dioxide, or organic peroxides, e.g. benzoyl peroxide or cumene hydroperoxide.

Example 2

This example demonstrates the use of the N-(3,5-di-tert - butyl - 2,5 - cyclohexadiene-4-one-1-ylidene)maleimide of Example 1 as a heat stabilizer for polyvinyl chloride compared with a known heat stabilizer for polyvinyl chloride, viz., 2,6-di-tert-butyl-4-methyl phenol. While the amount of the chemical is not critical, generally 1 to 4 parts of the chemical per 100 parts of the polyvinyl chloride are preferred.

Portions of a commercial polyvinyl chloride were compounded with 1.5 parts of N-(3,5-di-tert-butyl-2,5-cyclo-hexadiene-4-one-1-ylidene-methyl)maleimide (compound I) and 1.5 parts of 2,6-di-tert-butyl-4-methylphenol (compound II) per 100 parts of the polyvinyl chloride. The compounding was done on a two-roll mill, with rolls at 310° F. After compounding, the stock was molded, after 5 minutes preheating at 331° F., for 15 minutes at full ram pressure and at 331° F. An uncompounded control portion was similarly molded. From the molded slabs, pieces 2.5" x 0.5" were cut and aged in separate tubes at 350° F. in an aging block. By weighing the samples at intervals at room temperature, the weight loss was obtained which was calculated to percent weight loss.

The following table shows the percent weight loss for various times of heating Compounds I, II and the control.

| Hours at 350° F. | Compound | | Control |
|---|---|---|---|
| | I | II | |
| 5 | 1.3 | 6.3 | 18 |
| 7 | 1.9 | 17.2 | 34.7 |
| 8 | | 24.8 | |
| 8.5 | 2.4 | | 45.1 |
| 10.5 | 3.2 | | 48.3 |
| 11 | | 41.6 | |
| 15 | 11.5 | 49.0 | 51.4 |

It may be seen from the above that N-(3,5-di-tert-butyl-2,5-cyclohexadiene-4-one-1-ylidene-methyl)maleimide is a highly effective heat stabilizer for polyvinyl chloride.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. An N-(3,5-dialkyl-2,5-cyclohexadiene-4-one-1-ylidene-methyl)maleimide in which the alkyl radicals in the 3 and 5 positions have 1 to 8 carbon atoms.

2. N-(3,5-di-tert-butyl-2,5-cyclohexadiene-4-one-1-ylidene-methyl)maleimide.

3. The method of making an N-(3,5-dialkyl-2,5-cyclohexadiene-4-one-1-ylidene-methyl)maleimide which comprises treating a 2,6-dialkyl-4-(N-maleimidomethyl)phenol at room temperature with an oxidizing agent selected from the group consisting of potassium ferricyanide, ceric sulfate, ammoniacal silver nitrate, Fehlings solution, lead dioxide and organic peroxides.

4. The method of making N-(3,5-di-tert-butyl-2,5-cyclohexadiene-4-one-1-ylidene-methyl)maleimide which comprises treating 2,6-di-tert-butyl-4-(N-maleimidomethyl)phenol at room temperature with an oxidizing agent selected from the group consisting of potassium ferricyanide, ceric sulfate, ammoniacal silver nitrate, Fehlings solution, lead dioxide and organic peroxides.

5. Polyvinyl chloride containing a heat stabilizing amount of an N-(3,5-dialkyl-2,5-cyclohexadiene-4-one-1-ylidene-methyl)maleimide in which the alkyl radicals in the 3 and 5 positions have 1 to 8 carbon atoms.

6. Polyvinyl chloride containing a heat stabilizing amount of N-(3,5-di-tert-butyl-2,5-cyclohexadiene-4-one-1-ylidene-methyl)maleimide.

7. Polyvinyl chloride containing 1 to 4 parts of an N-(3,5-dialkyl-2,5-cyclohexadiene-4-one-ylidene-methyl)maleimide in which the alkyl radicals in the 3 and 5 positions have 1 to 8 carbon atoms per 100 parts of polyvinyl chloride.

8. Polyvinyl chloride containing 1 to 4 parts of N-(3,5-di-tert-butyl-2,5-cyclohexadiene-4-one-1-ylidene-methyl)maleimide per 100 parts of polyvinyl chloride.

No references cited.